US006292752B1

(12) United States Patent
Franke et al.

(10) Patent No.: US 6,292,752 B1
(45) Date of Patent: Sep. 18, 2001

(54) DEVICE FOR ACQUIRING LANE PATH INDICATIVE DATA

(75) Inventors: Uwe Franke, Uhingen; Zoltan Zomotor, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/187,530

(22) Filed: Nov. 6, 1998

(30) Foreign Application Priority Data

Nov. 6, 1997 (DE) ............................................. 197 49 086

(51) Int. Cl.[7] ....................................................... G06G 7/78
(52) U.S. Cl. ........................ 701/300; 701/301; 701/205; 701/210; 701/26; 340/435; 340/436; 342/70; 342/455
(58) Field of Search ..................................... 701/300, 301, 701/302, 23, 25, 26, 200, 205, 210, 27; 180/167, 168, 169; 340/435, 436, 437; 342/70, 455

(56) References Cited

U.S. PATENT DOCUMENTS

| | | | |
|---|---|---|---|
| 5,390,118 | * | 2/1995 | Margolis et al. ........................ 701/27 |
| 5,479,173 | | 12/1995 | Yoshioka et al. ........................ 342/70 |

FOREIGN PATENT DOCUMENTS

| | | |
|---|---|---|
| 42 21 015 A1 | 1/1993 | (DE) . |
| 43 32 836 C1 | 9/1994 | (DE) . |
| 196 07 429 A1 | 9/1997 | (DE) . |
| 0 446 903 B1 | 9/1991 | (EP) . |
| 7-198349 | 8/1995 | (JP) . |
| 7-239236 | 9/1995 | (JP) . |
| 8-68654 | 3/1996 | (JP) . |
| 8-122432 | 5/1996 | (JP) . |
| 8-315299 | 11/1996 | (JP) . |
| 9-96521 | 4/1997 | (JP) . |

OTHER PUBLICATIONS

Krebs, "Nonlinear Filtration", R. Oldenburg Verlag, Munich, 1980.
Bierman, "Factorization Methods for Discrete Sequential Estimation," Academic Press, New York, 1977.
Kuehnle, "Symmetry–Based Recognition of Vehicle Rears", Pattern Recognition Letters 12, pp. 249–258 (1991).
*IEEE Conference on Intelligent Transportation Systems,* pp. 595–600, entitled "Sensor fusion for improved vision based lane recognition and object tracking with range finders" by Z. Zomotor et al. 1998, no month.
*Machine Vision and Applications,* 1997, vol. 9, pp. 179–192 entitled "Estimations of previewed road curvatures and vehicular motion by a vision–based data fusion scheme" by Jin–Chuan Hsu et al. no month.
*Proceedings of the International Conference on Robotics and Automat,* vol. 4, pp. 3576–3583 entitled "Dynamic Data Temporal Multisensor Fusion in the Prometheus PROLAB2 Demonstrator" by M. Rombaut et al. 1994, no month.

* cited by examiner

Primary Examiner—William A. Cuchlinski, Jr.
Assistant Examiner—Yonel Beaulieu
(74) Attorney, Agent, or Firm—Crowell & Moring LLP

(57) ABSTRACT

A device for acquiring data indicative of the path of a lane is provided. The device incorporates a lane detection sensing circuit, an object position sensing circuit that detects at least the distance of an object located in front of the vehicle and its directional angle relative to the direction of vehicle motion, and a sensing circuit for the vehicle's own motion. An estimating device is provided that is supplied with lane recognition measurement data, object position measurement data, and measurement data on the vehicle's own motion. As a function of the vehicle's own motion, the estimating device determines the lane curvature and/or the transverse position of an object ahead of the vehicle relative to the lane by estimation, using a presettable estimation algorithm including a dynamic vehicle motion model. The device preferably includes a Kalman filter for this purpose, and is used, for example, in road vehicles.

9 Claims, 2 Drawing Sheets

DEVICE FOR ACQUIRING LANE PATH INDICATIVE DATA

BACKGROUND AND SUMMARY OF THE INVENTION

This application claims the priority of German Application No. 197 49 086.7, filed Nov. 6, 1997, the disclosure of which is expressly incorporated by reference herein.

The invention relates to a device for acquiring data indicative of the path of a lane, such as a road for example, and, more particularly, to a device including a lane detection sensing circuit that supplies lane detection measurement data, an object-positioning sensing circuit which detects at least the distance of an object located ahead of the vehicle and its directional angle relative to the direction of movement of the vehicle, and a vehicle intrinsic movement sensing circuit for detecting movement of the vehicle.

This device includes, first of all, a lane recognition sensing circuit that scans the lane area in front of the vehicle. The sensing circuit supplies lane recognition measurement data, in the form of lane marking coordinates for example. Sensing circuits of this kind are known, for example, in the form of optical lane recognition devices that include an imaging system and an image processing system connected downstream thereof, as disclosed for example in patent documents DE 43 32 836 C1 and EP 0 446 903 B1, as well as DE 42 21 015 A1. They are used in particular for automatic control of the lengthwise and/or transverse movement of vehicles as part of a spacing control device and/or an automatic vehicle steering system. The maximum distance at which lane markings can still be reliably detected by such sensing circuits, i.e. their range, is limited by many factors, such as the installation height of an associated video camera in the vehicle, the weather conditions, the time of day, the degree of contamination of the lane, etc. If the range is too short, autonomous vehicle guidance using these systems alone is no longer reliably possible. Pure spacing regulation devices likewise require knowledge of the lane path at a greater distance, for example up to at least approximately 150 m, with sufficiently high accuracy. Extrapolation of the lane path at this distance from the path recognized by purely optical lane recognition in the near field has proven to be unsatisfactory, at least with low visibility.

On the other hand, the device also includes an object position sensing circuit which detects at least the distance of an object located in front of the vehicle, for example a leading vehicle or an object that is stationary at the edge of the lane, as well as the angle at which this object appears relative to the direction of motion of the vehicle itself. Such sensing circuits are used in particular in spacing regulation devices in order to maintain a constant distance from a leading vehicle. The techniques used for this purpose, such as spacing detection using laser or radar beams, have the advantage that they supply reliable measurement results at greater distances even when optical visibility is low. However, these measurement data alone do not allow determination of the path of the lane.

Devices for acquiring data of a lane path of the type described above have already been proposed in which an object position sensing circuit based on radar is provided for detecting leading vehicles and an optical imaging and image processing system is provided as support for this vehicle-tracking radar in order to estimate the positions of objects ahead of the vehicle itself as an aid to the radar system. However, if the optical system does not supply reliable position data because of poor visibility for example, the performance of the entire system is again reduced to that of the radar system.

It is known that estimating devices in the form of so-called observers or Kalman filters can be used in vehicular applications for calculating certain vehicle-related parameters, for example the directional angle and other values related to driving dynamics. See for example German patent document DE 196 07 429 A1 and the literature cited therein regarding this use of estimation and/or observation concepts in vehicle systems.

The technical problem addressed by the invention is the provision of a device of the above-mentioned type with which lane path indicative data can be acquired comparatively reliably in real-time even under unfavorable environmental conditions. The device must allow, in particular, a reliable acquisition of the lane curvature and/or the transverse position of objects in front of the vehicle relative to the lane.

The present invention solves this problem by providing a device for acquiring data indicative of the path of a lane detection sensing circuit that supplies lane detection measurement data, an object-positioning sensing circuit which detects at least a distance of an object located ahead of the vehicle and its directional angle relative to a direction of movement of the vehicle, and a vehicle intrinsic movement sensing circuit for detecting movement of the vehicle. This device includes an estimating device to which the lane recognition measurement data from the optical lane recognition sensing circuit and the object position measurement data from the object position sensing circuit are supplied. As a function of these measurement data, the device according to the invention determines the lane curvature and/or the positions relative to the lane of any objects detected in front of the vehicle by estimation using an estimation algorithm that can be specified in advance and that incorporates a dynamic vehicle movement model.

In particular, the estimating device can be a so-called observer or Kalman filter. Since the output signals of both the lane recognition sensing circuit and the object position sensing circuit are fed to the estimating device, a non-trivial fusion of both sensor functionalities by the estimating algorithm is achieved in the device. This means that even in the event of a temporary failure of one sensing circuit or the other, a reliable estimate of the lane path and/or the transverse positions of objects in front of the vehicle itself relative to a lane is possible, with the accuracy generally being significantly higher than in the case of a simple provision of both sensing circuits without a sensor-merging estimating device.

In a device according to a preferred embodiment of the invention the geometric relationships between the measured values detected by the lane recognition sensing circuit and the object position sensing circuit are used as the measurement equations and their dynamic relationships are incorporated as state value differential equations into the estimation algorithm. The transverse position of an object detected in front of the vehicle is entered into the differential equation system relative to the lane as a time-constant state variable. This model is especially suitable in embodiments in which the object position sensing circuit supplies the directional angle and the distance of the objects directly and not merely raw data relative to the latter, so that the assignments of the objects relative to the object states and their corresponding measurement equations is provided directly. If this is not the case, an advantageous improvement according to the invention also includes the object distance and its rate of change as state variables in the differential equation system, with the distance change rate being treated as a parameter that is constant over time.

In another preferred embodiment of the invention, the estimating device consists of a Kalman filter.

Other objects, advantages and novel features of the present invention will become apparent from the following detailed description of the invention when considered in conjunction with the accompanying drawings.

DETAILED DESCRIPTION OF THE DRAWINGS

Figure 1:
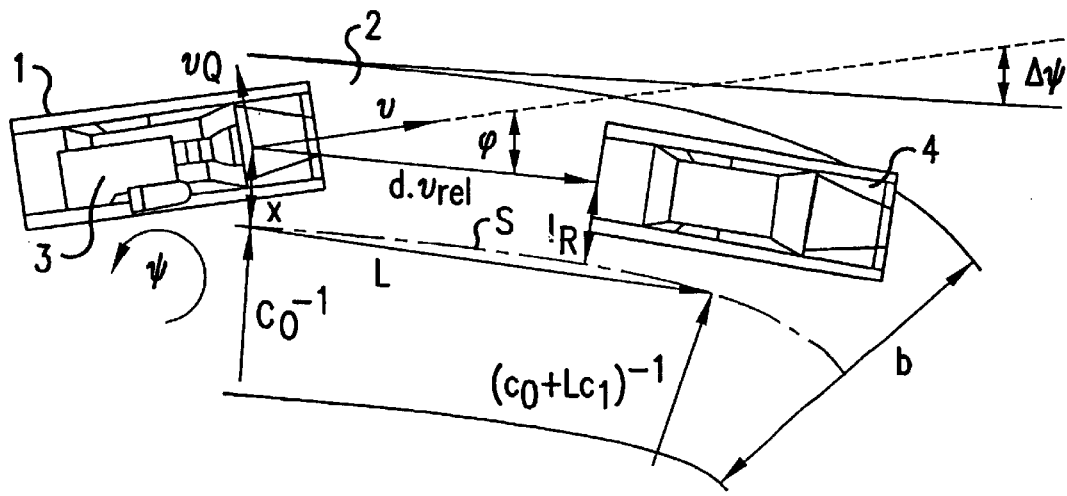
FIG. 1 is a schematic diagram of a road traffic situation with an automobile equipped according to the invention and with a leading automobile.

FIG. 1 illustrates a traffic situation in which an automobile 1 is moving at a lengthwise (longitudinal) velocity v, a transverse velocity $v_Q$ and a yaw velocity $\dot\psi$ on a lane 2 of a road. Vehicle 1 is equipped with a device 3 for acquiring lane path indicative data, especially the curvature of lane 2 in the area in front of the vehicle 1 as well as the transverse position $x_R$, measured relative to the middle of the lane, of an object located ahead of the vehicle 1, such as a leading automobile 4. This device 3 incorporates firstly a conventional radar-based object position sensing circuit with which directional angle $\phi$ between the direction in which the object 4 located ahead of vehicle 1 appears relative to the lengthwise direction of vehicle 1, as well as the distance d and the relative velocity $v_{rel}$ of object 4, hereinafter referred to as the radar object. The relative yaw angle, i.e. the angle in the lengthwise direction of the vehicle to the lane tangent, is represented by $\Delta\psi$. The lane width is indicated by b. The lane curvature is designated $c_0$ and the change in curvature by $c_1$. Well-designed roads are arranged so that the lane curvature $c_0$ changes approximately proportionately with the constant rate $c_1$, i.e. the curvature $c_0(L)$ at a distance L is given by $c_0(L)=c_0(0)+c_1 L$. The transverse position of vehicle 1 relative to the middle of the lane S is indicated by x and that of the radar object by $x_R$.

Device 3 for acquiring lane path indicative data also incorporates a conventional sensing circuit for the vehicle's own motion with which the measured values of the vehicle 1 can be detected, such as the lengthwise velocity v, transverse velocity $v_Q$, and the yaw velocity $\dot\psi$, as well as a conventional lane detection sensing circuit in the form of an optical imaging and image-processing system. This system includes as the picture-taking element a video camera, such as a CCD camera, with the focal parameters $f_x$ and $f_y$ in the lengthwise and transverse directions, respectively. The camera is mounted at a height H above the lane at a tilt angle α. If, in addition, a parameter "a" with a value of −0.5 is introduced for the marking of the left lane edge and a parameter "b" with a value of +0.5 for the marking of the right lane edge, the following relationships exist between the camera image coordinates $x_b$, $y_b$ of the lane edge marking at a distance L.

$$x_B=f_x(ab-x-\Delta\psi L+c_0 L^2/2+c_1 L^3/6)/L$$

and $$L=H(1-y_B \tan \alpha/f_y)/(y_B/f_y+\tan \alpha)$$

The unknown values in the above relationship for the camera image coordinate $x_B$ can be determined by parameter estimating methods such as the method of least squares for example, if a sufficient number of image coordinates $x_B$, $y_B$ of different lane markings have been detected by the image-processing system. However, better results are obtained by using an observer or Kalman filter technique in which the kinematic couplings and dynamic conditions of the relevant parameters are taken into account for estimation. Then, using the estimation method, the sensor information from the lane detection sensing circuit and the object position sensing circuit can be merged to different degrees in different variations, with the various possibilities discussed in greater detail below. The procedure is based on the fact that the physical relationships are initially represented specifically and then in a system-theoretical form with a linear process model of the form $$\dot{\underline{x}}=A\underline{x}+B\underline{u}$$

as well as a nonlinear measurement equation of the form $$\underline{y}=\underline{h}(\underline{x})$$

as is conventional for observers and Kalman filters, where $\underline{x}$ is the state variable vector, $\underline{y}$ is the measured value vector, and $\underline{u}$ and $\underline{h}(\underline{x})$ are the vector functions to be determined from the relationships that are valid for the system in question, as well as matrices corresponding to A and B. A comparison with the above relationships produces as vector $\underline{x}=(x, \Delta\psi, c_0, c_1, \alpha, b)^T$ the state variable, the one-line vector $\underline{y}=(x_B)$ as the measured value vector, and the relationship $\underline{h}(\underline{x})=f_x(ab-x-\Delta\psi L+c_0 L^2/2+c_1 L^3/6)/L$ for h. Only the matrix elements $A_{12}=-A_{23}=A_{34}=v$ of the 6×6 matrix A, and only the elements $B_{11}=B_{22}=1$ of the 2×2 matrix B are not equal to 0, while the remainder of the matrix elements are zero. The vector $\underline{u}$ proves to be $\underline{u}=v_Q$, $\dot\psi$.

It is understood in this connection that each pair of measured image coordinates $(x_B, y_B)$ of the lane markings produces a measurement equation line of the form $\underline{y}=\underline{h}(\underline{x})$.

Within the framework of a simple fusion of the sensor data, the transverse position $x_R$ of a radar object at a distance d and at an angle $\phi$ can be approximated by the relationship $$X_R=\phi d+x+\Delta\psi d=c_0 d^2/2-c_1 d^3/6 \tag{G1}$$

with the lane data of the transverse position x and the direction angle $\Delta\psi$ of vehicle 1 relative to the lane as well as the lane curvature parameters $c_0$ and $c_1$ being included in this relationship. Preferably, there is a more complicated fusion of the sensor output data, as explained in greater detail below.

Figure 2:
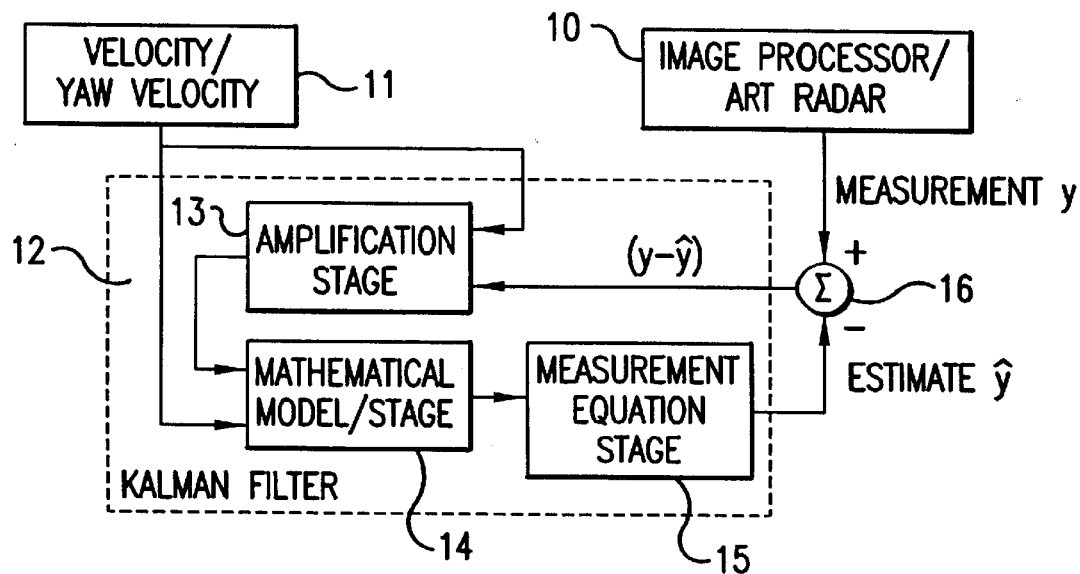
FIG. 2 is a schematic block diagram of the device according to the invention arranged in the rear automobile in FIG. 1 for determining lane path indicative data.

FIG. 2 shows a device that is also suitable for a more complex sensor fusion technique of this kind. The device in FIG. 2 includes the necessary lane recognition and object position sensing circuit unit 10, which supplies the measured values of the measurement parameters $\underline{y}$. The lane recognition sensing circuit, as mentioned above, is formed by an imaging and image-processing system, but alternatively can also be in the form of other devices with lane-recognizing functions, for example a system that is based on induction loops or magnetic nails along the lane or a system based on the so-called GPS (global positioning system) for exact determination of the vehicle position. The object position sensing circuit in the example shown is in the form of the radar part of a spacing-regulating cruise control (ART), however another conventional system can also be used for this purpose of recognizing the position of objects in front of the vehicle and especially of leading vehicles that detects the distances of such objects as well as the angle at which each of the objects appears. In addition, the device has a sensing circuit 11 for the vehicle's own motion which detects among other things the lengthwise and transverse velocities v, $v_Q$ of the vehicle itself, and its yaw velocity $\dot{\psi}$.

The device in FIG. 2 has as a central component a Kalman filter 12 of conventional design with an amplification stage 13, a model calculating stage 14, and a measurement equation stage 15. At the output of measurement equation stage 15, the estimating measured value vector $\hat{y}$ is output as an output signal which is subtracted in a subtracter 16 from the measured values of measured value vector $\underline{y}$. The resultant difference $\underline{y}-\hat{y}$ is supplied to one input of the amplification stage 13, to which the output signal of the sensing circuit 11 for the vehicle's own motion is supplied. The output signal from sensing circuit 11 for the vehicle's own motion is supplied in parallel to one input of model calculating stage 14, to which the output signal of amplification stage 13 is supplied at a second input. The output signal from model calculating stage 14 is supplied to the measurement equation stage 15, which generates from it the estimated measured value vector $\hat{y}$. The linking, i.e. fusion of the output signals of the object positioning sensing circuit and the lane recognition sensing circuit by means of this Kalman filter technique makes it possible to improve simultaneously both lane recognition and lane assignment of the radar object.

In a first improved version of the simple sensor fusion explained above, the data from the object-positioning sensing circuit, i.e. the radar, is used to improve lane estimation so that the non-directly-measurable transverse position $x_R$ of a radar object is introduced as a state variable into the estimation algorithm. As a model for this transverse position $x_R$, it is assumed that radar objects, including leading vehicles, retain their positions relative to the lane as an average over time so that the state differential equations for each radar object are expanded by the amount of the equation $\dot{x}_R=0$. In addition, the relationship $$\phi=-x/d=\Delta\psi+c_0d/2+c_1d^2/6+x_R/d$$

obtained from the above relationship for the transverse position $x_R$ of a radar object is utilized for the radar object direction angle $\phi$ as an additional measurement equation. In fact, the spacing radar measures the distance d, the relative velocity $v_{rel}$ and the direction angle $\phi$. Thus, for each radar object, the state variable vector $\underline{x}$ expands by the respective transverse position $x_R$ of the radar object in question, while the vector $\underline{u}$ remains unchanged and matrices A and B are expanded only by additional matrix elements with the value of zero. In addition, the system-theoretical measurement equation expands per radar object by one additional line at a time of the form $y=\phi$ with $h(\underline{x})=$ $$-x/d-\Delta\psi d+c_0d/2+c_1d^2/6+x_R/d.$$

For the sake of clarity, additional subscripts for the respective radar objects were not introduced.

The device thus created is especially suitable for determining the lane path in front of the vehicle itself and the transverse positions of objects detected from it using the estimation algorithm by means of Kalman filters for those applications in which the spacing radar supplies the distance d and the directional angle $\phi$ for each radar object so that the assignment to the radar object states, i.e. especially their transverse positions $x_R$ relative to the lane and their corresponding measurement equations, is given directly. In real systems however the spacing radar initially supplies only rough radar targets, in other words sets of associated measurements of the distance d, the relative velocity $v_{rel}$, and the directional angle $\phi$, from which the radar objects are generated as stored objects by tracking rough radar targets, in other words by assigning current measurements to stored objects which in turn correspond to earlier filtered measurements.

In this case, the device in FIG. 2 in a further preferred embodiment can be so designed that the radar objects are generated in the sensor fusion system itself. For this purpose, the estimation algorithm in the Kalman filter 12 is expanded as follows: for each radar object, the distance $d_R$ and the relative velocity $v_{relR}$ are also added as state variables for which the kinematic state differential equations $$\dot{d}_R=v_{relR} \text{ and } \dot{v}_{relR}=0$$

are used. The states $d_R$ and $d_{relR}$ are measured directly so that the geometric relationship between these state variables $v_R$, $\dot{v}_{relR}$, and measured values d, $v_{rel}$ are provided by $d=d_R$ and $v_{rel}=\dot{v}_{relR}$. Thus, for each radar object, the state variable vector $\underline{x}$ is expanded by the three-line vector $(r_R, d_R, v_{relR})$ from which an additional subscript for differentiating between the different radar objects has been omitted for the sake of clarity. In addition, matrix A expands accordingly in the main diagonal by a 3×3 matrix in which only the element of the second line and the third column has a value of 1 while the other matrix elements are zero. The vector $\underline{u}$ remains unchanged. The system-theoretical measurement equation on the other hand expands per radar object by the additional measured value vector $\underline{y}_2=(\phi, d, v_{rel})^T$ and by three corresponding additional lines $$\underline{h}_2(x)=(-x/d_R=\Delta\psi+c_0d_R/2+c_1d_R^2/6+x_R/d_R,d_R,v_{relR})^T$$

for the function $h(\underline{x})$. The target can be tracked for example by the rough radar targets being assigned for the three measured values $\phi$, d, and $v_{rel}$ of the spacing radar to the radar objects with the aid of a 3σ (three standard deviation) test. Such a 3σ test, for example, is described in the dissertation by B. Mysliwetz, Parallel Computer-Based Image Tracking Interpretation for Autonomous Vehicle Control, University of the Bundeswehr, Munich, 1990. If necessary, an expanded Kalman filter can be used for the filter design in which stochastic processing noise is added to the state differential equation system, and stochastic measuring noise is added additively to the measurement equation system. For further processing, including discretization and factorization of such an expanded continuous Kalman filter, reference can be made to the literature, see for example V. Krebs, "Nonlinear Filtration," R. Oldeburg Verlag, Munich, 1980, and Bierman, "Factorization Methods for Discrete Sequential Estimation," Academic Press, New York, 1977.

Figure 3:
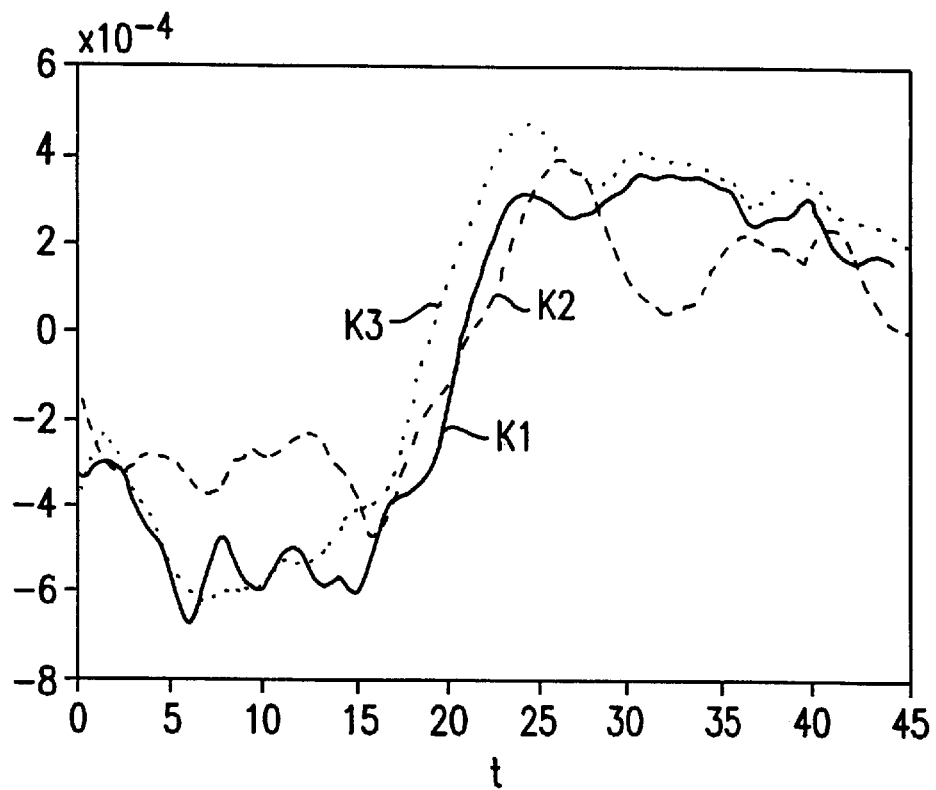
FIG. 3 is a diagram illustrating the lane curvatures determined by the device according to FIG. 2.

In the graph in FIG. 3, results are presented for the estimation of the lane path, especially for the value of the lane curvature $c_0$ determined by estimation as a function of the time t during a sample portion of a drive. The results according to the above-mentioned simple sensor fusion are compared with the results of the just-described system design with a sensor fusion with three states per radar object in a Kalman filter. In cases of good visibility, for example more than about 60 m, the results for the two system designs are approximately the same and illustrated by the common solid curve K1, which consequently can serve as a reference for the case of poor visibility. For comparison, the same portion of the lane was traveled again for the case of poor visibility of only about 20 meters. The dashed curve K2 then shows the results of the simple sensor function without using the spacing radar data to improve the lane estimate, while dotted curve K3 shows the result of the complex sensor fusion system with three states per radar object for the state estimate. It can be seen from the values for $c_0$ that the lane section traversed initially was a left-hand curve for the first 20 seconds and then made a transition to a right-hand curve.

It is also evident from FIG. 3 that when visibility is poor, the estimate of lane curvature $c_0$ by the system with more complex sensor fusion K3 comes much closer to the reference curve according to curve K1 than the result of purely optical lane recognition with only simple sensor fusion according to curve K2. In addition, one can see that the lane curvature estimated by the system with the more complex sensor fusion with poor visibility is ahead of the lane curvature estimated by the two systems in question during good visibility at the transition from the left-hand curve to the right-hand curve. This can be interpreted as an increase in visibility with the aid of the radar object or objects that are detected. With good visibility, therefore, this leading effect is not so prominent because then there are more measurement points from the optical lane detection sensing circuit and the measurement of the radar object is therefore not as important.

Figure 4:
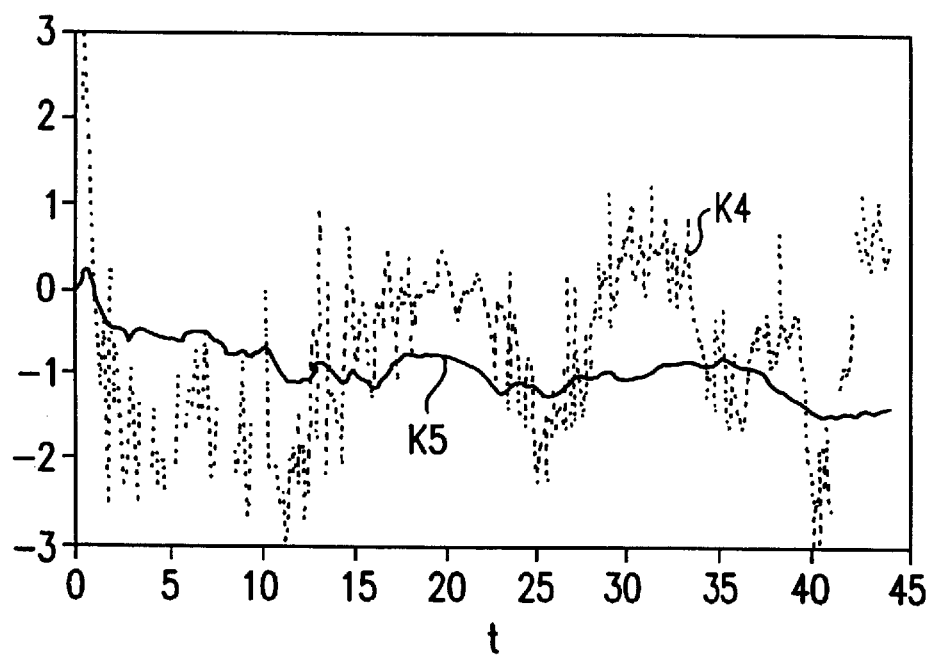
FIG. 4 is a diagram showing the transverse position of the leading vehicle as determined by the device according to FIG. 2.

In the graph in FIG. 4, the results of the two system designs referred to in FIG. 3 are illustrated in connection with the determination of the transverse position $x_R$ of a leading detected radar object, i.e. in particular a leading vehicle 4, by estimation. The distance of this object from the source vehicle varied between about 85 m and 115 m. The curve K4 plotted as a string of dots and with more noise presents the results for the estimated transverse position $x_R$ as a function of time t for the sample driving section with poor visibility, as obtained by the system using simple sensor fusion, in which the transverse position $x_R$ of the radar object is calculated using unfiltered spacing radar measurements on the basis of the above approximation equation G1 for $x_R$. The solid, smoother curve K5 on the other hand shows the result of the estimate of the transverse position $x_R$ of the radar object for the same driving situation by the system with more complex sensor fusion in which this transverse position $x_R$, in addition to the radar object distance $d_R$ and the object relative velocity $v_{relR}$, enters the Kalman filter as a state variable.

While similar results are obtained for the case, not shown, of good visibility as the result of low pass filtration of the curve with greater noise of the system with simple sensor fusion than with the system with more complex sensor fusion, with poor visibility it turns out that in this situation only the system with more complex sensor fusion supplies a result for the radar object transverse position $x_R$ determined by estimation that is similar to that with good visibility. The system with simple sensor function on the other hand delivers a significantly different result with this poor visibility. Even a low pass filtration of curve K4 results in a pattern that is still significantly different from that of curve K5.

From this it follows that the more complex sensor fusion with a Kalman filter, especially with poor visibility, delivers much better estimation results even for the transverse positions $x_R$ of objects located in front of the vehicle than a simple linking of lane detection and distance radar. In contrast to the simple linking of optical lane recognition and distance radar, sensor fusion with the Kalman filter makes it possible to reliably calculate the lane deviation, in other words, the transverse positions of leading vehicles and other objects in front of the vehicle, even with poor visibility. Depending on the system design, a preprocessing or target tracking using the radar data can be assumed for sensor fusion, or raw radar data can be processed in the Kalman filter. In the latter case, the device according to the invention, in addition to the lane data, also supplies optimally filtered radar objects in the sensor of minimum variation.

The device according to the invention allows acquisition of lane path indicative data in the form of estimated lane curvature $c_0$ and/or transverse position $x_R$ of an object in front of the source vehicle in real-time, even with the naturally limited calculation capacities in vehicles. Of course, in addition to those described, additional versions of the device according to the invention are possible. Thus, an even more complex system design for further improvement of lane estimation can be provided in which, for more exact measurement of the direction angle $\phi$ of a given radar object using a spacing radar, the approximate object position can be determined and this can then be determined by means of an imaging and image processing system with higher accuracy. For image processing, a simple object recognition method can be used which for example utilizes the symmetry of objects such as vehicles, see for example A. Kühnle, "Symmetry-Based Recognition of Vehicle Rears," Pattern Recognition Letters Apr. 12, 1991, page 249. In addition, instead of the distance radar system, another object position sensing circuit can be used, for example a stereo image recording and stereo image processing system if there is sufficient computing power. The relative velocity which, in this case, is no longer directly measurable can then be observed as a state in the Kalman filter.

Another possible method of lane detection consists in using a GPS and a suitable digital road system map. In this way, the position of the source vehicle and the coordinates of the current lane at a distance $L_{GPS}$ can be determined, and the measuring equation system can be expanded by the line $$x_{GPS} = -x + \Delta\psi L_{GPS} + c_0 L^2_{GPS}/2 + c_1 L^3_{GPS}/6$$

The device according to the invention, because of its ability to provide a reliable estimate of the lane path by taking into account fixed and/or moving objects in a closed estimation algorithm, can be used in a supporting role in systems for automatic transverse and/or lengthwise guidance of motor vehicles and in warning systems, for example in a closing warning system in which the following vehicle is closing in on the vehicle ahead.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for acquiring data indicative of a path of a lane of a vehicle, comprising:

a lane detection sensing circuit that supplies lane detection measurement data;

an object-positioning sensing circuit which detects at least a distance (d) of an object located ahead of the vehicle and its directional angle relative to a direction of movement of the vehicle;

a vehicle intrinsic movement sensing circuit for detecting movement of the vehicle; and an estimating device that is supplied with lane detection measurement data from the lane detection sensing circuit and object position measurement data from the object position sensing circuit, as well as measurement data for the vehicle's own motion from the vehicle intrinsic movement sensing circuit, and which, as a function of these measurement data, determines at least one of a (1) lane curvature ($c_0$) and (2) a transverse position ($x_R$) of said object relative to the lane detected by the object position sensing circuit, by estimation using a presettable estimation algorithm that incorporates a dynamic vehicle movement model, further wherein geometric relationships between measured values detected by the lane detection sensing circuit and the object position sensing circuit are entered as measurement equations and their dynamic relationships are entered as state variable differential equations into the estimation algorithm, with the transverse position ($x_R$) of the object being treated in the differential equations as a time-constant state variable.

2. The device according to claim 1, further wherein the distance ($d_R$) and a distance change rate ($v_{relR}$) are used as additional state variables in the estimation algorithm, with the distance change rate being treated as a time-constant state variable.

3. The device according to claim 1, further wherein the estimating device is a Kalman filter.

4. The device according to claim 2, further wherein the estimating device is a Kalman filter.

5. A method for acquiring data indicative of a path of a lane of a vehicle, the method comprising the acts of:

sensing lane detection measurement data;

detecting a distance (d) of an object located ahead of the vehicle and its directional angle ($\phi$) relative to a direction of movement of the vehicle;

detecting movement of the vehicle itself;

estimating at least one of: (a) a lane curvature ($c_0$) and (b) a transverse position ($x_R$) of said object relative to the lane, using a presettable estimation algorithm incorporating a dynamic vehicle movement model as a function of the lane detection measurement data, the distance (d) of the object located ahead of the vehicle and its directional angle ($\phi$) relative to the direction of movement of the vehicle, as well as the vehicle's own motion, further comprising the act of entering geometric relationships between the lane detection measurement data and the distance and directional angle data as measurement equations, wherein their dynamic relationships are entered as state variable differential equations into the estimation algorithm, with the transverse position ($x_R$) of the object being treated in the differential equations as a time-constant state variable.

6. The method according to claim 5, further comprising the act of using a distance ($d_R$) and a distance change rate ($v_{relR}$) as additional state variables in the estimation algorithm, with the distance change rate being treated as a time-constant state variable.

7. The method according to claim 5, wherein the act 6f estimating is performed using Kalman filtering.

8. A software product for use in a device for acquiring data indicative of characteristic of a path of a travel lane of a vehicle, comprising:

a computer readable medium having stored thereon a program code that:

estimates at least one of a lane curvature ($c_0$) and a transverse position ($x_r$) of an object relative to the path of a lane of a vehicle using a presettable estimation algorithm incorporating a dynamic vehicle movement model as a function of lane detection measurement data, object-positioning sensing data and a vehicle's own motion data, wherein the computer readable medium has further stored thereon a program code segment that enters geometric relationships between the lane detection measurement data and the object-positioning sensing data as measurement equations, wherein their dynamic relationships are entered as state variable differential equations into the estimation algorithm, with the transverse position of the object being treated in the differential equations as a time-constant state variable.

9. The software product according to claim 8, wherein the computer readable medium has further stored thereon a program code segment that uses a distance ($d_r$) and a distance change rate ($v_{relR}$) as additional state variables in the estimation algorithm, with the distance change rate being treated as a time-constant state variable.

* * * * *